United States Patent

Oh

[11] Patent Number: 5,995,484
[45] Date of Patent: Nov. 30, 1999

[54] TECHNIQUE FOR OBTAINING CHECKSUM IN A FAST FOURIER TRANSFORMATION NETWORK

[75] Inventor: Choong-Gun Oh, Seoul, Rep. of Korea

[73] Assignee: SamSung Electronics Co., Ltd., Kyungki-do, Rep. of Korea

[21] Appl. No.: 08/997,616

[22] Filed: Dec. 23, 1997

[30] Foreign Application Priority Data

Mar. 19, 1997 [KR] Rep. of Korea .......................... 97-9304

[51] Int. Cl.⁶ .................................... H04J 11/00
[52] U.S. Cl. .......................... 370/210; 370/388; 714/746
[58] Field of Search .................................. 370/203, 210, 370/357, 386, 388; 375/200; 364/726; 714/746, 752, 756, 819

[56] References Cited

U.S. PATENT DOCUMENTS

| | | |
|---|---|---|
| 4,964,126 | 10/1990 | Musicus et al. .......................... 714/797 |
| 4,977,533 | 12/1990 | Miyabayashi et al. . |
| 5,091,875 | 2/1992 | Wong et al. . |
| 5,247,524 | 9/1993 | Callon . |
| 5,297,070 | 3/1994 | Hua et al. . |
| 5,481,488 | 1/1996 | Luo et al. . |
| 5,491,652 | 2/1996 | Luo et al. . |
| 5,500,864 | 3/1996 | Gonia et al. . |
| 5,663,952 | 9/1997 | Gentry, Jr. .............................. 370/252 |

*Primary Examiner*—Ajit Patel
*Assistant Examiner*—Bob A. Phunkulh
*Attorney, Agent, or Firm*—Robert E. Bushnell, Esq.

[57] ABSTRACT

A technique for obtaining checksum in an FFT network composed of N stage modules includes: an adder-multiplier and a first adder respectively connected to two inputs of each stage module, a second and a third adder respectively connected to two outputs of each stage module, a first comparator for comparing the outputs of the first and second adders, and a second comparator for comparing the outputs of the adder-multiplier and third adder, the checksum being calculated at every stage to detect defects.

8 Claims, 6 Drawing Sheets

TECHNIQUE FOR OBTAINING CHECKSUM IN A FAST FOURIER TRANSFORMATION NETWORK

CLAIM OF PRIORITY

This application makes reference to, incorporates the same herein, and claims all benefits accruing under 35 U.S.C. §119 from an application for APPARATUS FOR OBTAINING CHECKSUM IN A FAST FOURIER TRANSFORMATION NETWORK AND METHOD THEREFOR earlier filed in the Korean Industrial Property Office on Mar. 19, 1997 and there duly assigned Ser. No. 9304/1997.

BACKGROUND OF THE INVENTION

1. Field of the Invention

The present invention concerns a technique for resolving defects occurring in a fast fourier transformation (FFT) network, and more particularly, to a technique for obtaining checksum in an FFT network.

2. Description of the Related Art

Conventionally, there have been proposed time redundancy, hardware redundancy and algorithm mixing the two methods in order to resolve the defects occurring in an FFT network. The time redundancy method is to duplicate the same steps of calculating data in order to detect defects by comparing the two results. The hardware redundancy method is to duplicate the circuits for calculating data. These two methods suffer a drawback in that they require more than 200% overhead for the time or hardware. In addition, the time redundancy method makes it possible to detect a temporary error in transmission, but not a defect inherent in the circuits.

However, the method of using a specific algorithm overcomes such drawbacks by employing partly the time redundancy and partly the hardware redundancy. In this case, the algorithm is applied to the input and output lines of the network. When a package of data is outputted through an FFT network with a checksum obtained by discrete fourier transform (DFT), the output data package is subjected to another calculation procedure to obtain a checksum, which is compared with the previous checksum in order to detect defects occurring in the network. This requires a hardware overhead such as checksum calculation circuits and comparators for comparing the calculated checksums. Such overhead becomes small compared to the hardware redundancy. Moreover, the checksum calculation for the input data is achieved simultaneously during transmission through the FFT network, so that the time overhead is required only for calculating upon the checksum of the output data, thereby reducing the time overhead. This method of using an algorithm has the following drawbacks when applied to the input and output lines of the network:

Firstly, the detection of a defect is made possible only after passing all the stages of an FFT network, resulting in a considerable time delay. For example, a defect occurring in the first stage circuit can be only detected in the last stage when the checksum of the data transmitted to the last stage is obtained and compared with the previous checksum of the input data. This requires retransmission of a large amount of data, degrading the efficiency of processing data.

Secondly, the data error is continuously accumulated through the network so as to mislead the detection of a defect. Namely, the value of the input data is changed by butterfly computation whenever passing each node of the FFT network. Hence, the data error indicating the defect is subjected to alteration through each node, thus misleading the detection.

Thirdly, it is impossible to considerably reduce the overhead ratio of the hardware. The hardware overhead of an FFT network for eliminating defects is generally calculated by the number of the multipliers required in addition. According to this, there is required about 1.2 to 2/$\log_2 N$ for a design to presently meet the minimum hardware overhead, where "N" represents the total number of the input data.

The following patents each disclose features in common with the present invention but do not teach or suggest the specifically recited technique for obtaining a checksum in accordance with the present invention: U.S. Pat. No. 5,481,488 to Luo et al., entitled Block Floating Point Mechanism For Fast Fourier Transform Processor, U.S. Pat. No. 5,491,652 to Luo et al., entitled Fast Fourier Transform Address Generator, U.S. Pat. No. 5,297,070 to Hua et al., entitled Transform Processing Circuit, U.S. Pat. No. 4,977,533 to Miyabayashi et al., entitled Method For Operating An FFT Processor, U.S. Pat. No. 5,091,875 to Wong et al., entitled Fast Fourier Transform (FFT) Addressing Apparatus And Method, U.S. Pat. No. 5,500,864 to Gonia et al., entitled Checksum Calculation Unit And Method For Error Detection On Data Packets, and U.S. Pat. No. 5,247,524 to Callon, entitled Method For Generating A CHecksum.

SUMMARY OF THE INVENTION

It is an object of the present invention to provide a technique apparatus for obtaining a checksum in an FFT network with means for preventing the detection of a defect from being delayed.

It is another object of the present invention to provide a technique for eliminating a defect by obtaining a checksum for each stage of an FFT network.

According to one aspect of the present invention, an apparatus for obtaining a checksum in an FFT network composed of N/2*logN stage modules comprises an adder-multiplier and a first adder respectively connected to two inputs of each stage module, a second and a third adder respectively connected to two outputs of each stage module, a first comparator for comparing the outputs of the first and second adders, and a second comparator for comparing the outputs of the adder-multiplier and third adder, whereby the checksum is calculated at every stage to detect defects.

According to another aspect of the present invention, a method of obtaining a checksum in an FFT network composed of N/2*logN stage modules each having a first and a second input and a first and a second output comprises the steps of adding and 1 bit left-shifting the first inputs of said modules while adding, multiplying, and 1 bit left-shifting the second inputs of the modules, adding the first and second outputs of the modules while subtracting the first outputs from the second outputs, comparing the added first inputs with the added and left-shifted first and second outputs, and comparing the added, multiplied, and left-shifted second inputs with the result of the subtracting, whereby the checksum is calculated at every stage to detect defects.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The inventive checksum structure for an FFT network is designed to apply the checksum to every stage of the network, as compared to the checksum structure where the input and output are only subjected to the checksum. Thus, the errors occurring in each stage are detected independently from those in other stages, so that the error detection latency may be significantly reduced. Moreover, this also eliminates the error accumulation, making it effective to detect defects because the stagewise operations make it possible to instantly detect an error occurring in every stage. This structure may be readily applied to a multidimensional FFT.

After considering the FFT algorithm, the inventive stagewise algorithm will be described with respect to coping with the defects occurring in the FFT network. The FFT algorithm may give Discrete Fourier Transform (DFT) for an input data sequence of size N as defined in Formula 1.

Formula 1

$$X(k) = \sum_{j=0}^{N-1} \chi(j) W_N^{jk}, 0 \leq k \leq N-1$$

Wherein $\chi(j)$ represents "j"th input, and X(k) the "k"th output.

$$W_N^{jk}\left(= \exp\left(\frac{-\iota 2\pi jk}{N}\right)\right)$$

"N"th root of a root of unity called a "twiddle factor". X(j) and X(k) are all complex numbers. Using the FFT algorithm developed by Cooley & Tukey, the complexity of Formula 1 may be reduced from O ($N^2$) to O (N $\log_2$N). Based on this algorithm has been developed two different types of decimation in time and in frequency. The FFT is processed through $\log_2$N stages, each of which consists of N/2 fundamental formulae which are the so called butterfly. Each butterfly produces the following Formulae 2 and 3 along with a pair of output numbers c and d and a pair of input numbers a and b.

Formula 2

$$c = a + bxW_N^{jk}$$

Formula 3

$$d = a - bxW_N^{jk}$$

Figure 1:
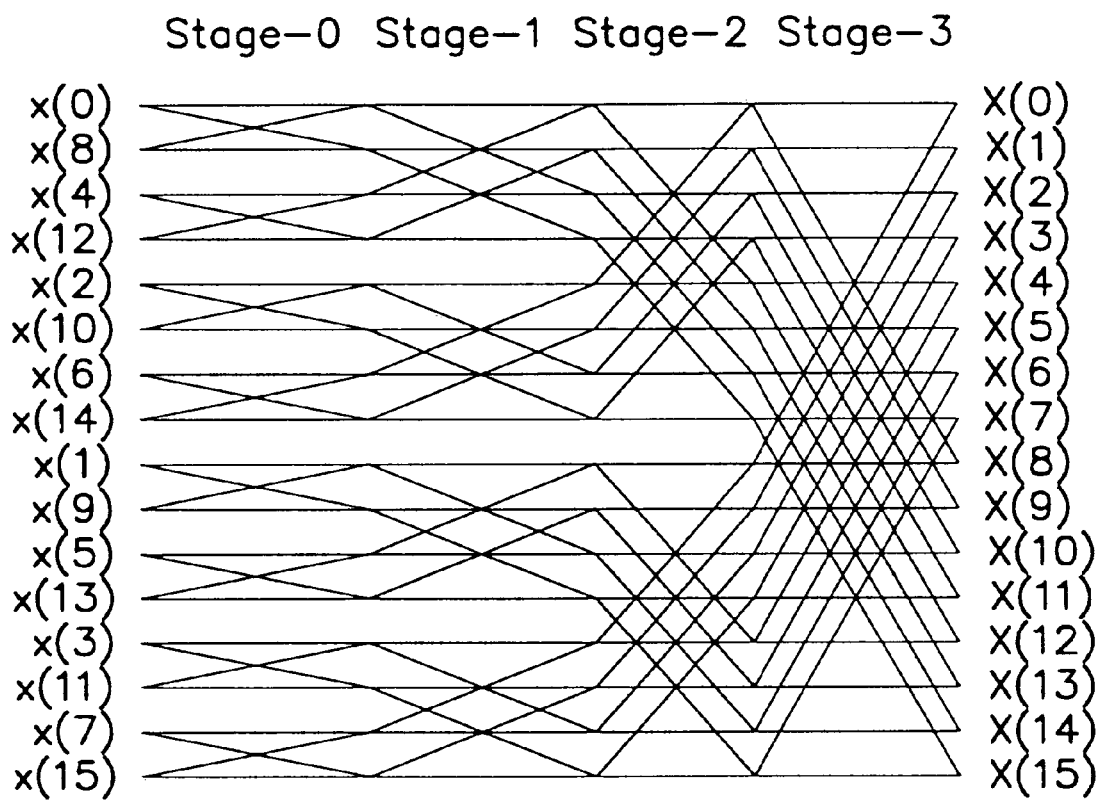
FIG. 1 is a diagram illustrating the flow of an FFT with 16 inputs of data.

Referring to FIG. 1 illustrating the flow of an FFT with $N=2^4=16$ inputs of data, four stages 0 to 3 are required to carry out data transformation. In order to overcome defects of the FFT network, algorithm-based fault tolerance (ABFT) employs the checksum structure to encode and decode each of the input and output data to obtain the input and output checksum.

The ABFT structure was proposed by Jou and Abraham in order to detect the errors occurring in the FFT network. The checksum structure has been developed from the ABFT structure by combining the original DFT and the rotated DFT. Thereafter, the reversed DFT is used to construct the checksum comparator. In this case, the hardware overhead becomes $2/\log_2 N$ for N-point FFT only considering the multipliers for the hardware complexity.

Meanwhile, Tao and Hartmann have proposed a design combining two different error detection structures. One is to multiply both ends of the original DFT by using the weighted vector of size N obtained from circulatory calculation. The other is to detect errors in one of the input links of the module positioned above the stage-0, which errors can not be detected in the one detection structure. In this case, the original input data is not transformed through the network, so that the steps of encoding and decoding do not cause the performance delay compared to the design of Jou and Abraham. This design requires hardware overhead of $2.5/\log_2 N$, but enhances the capacities of detecting defects and processing data.

Wang and Jha have simplified the calulation of the output checksum. Reddy and Banerjee have proposed the error detection structure employing the sum-of-squares of all of the input and output data. In this case, the overhead is about $1.5/\log_2 N$ for real input data. Oh and Youn have developed the checksum structure to apply the linear weight factor to both input and output positions. In this case, the hardware overhead is respectively $1.2/\log_2 N$ or $2/\log_2 N$ for real or complex input data.

The essential objectives of the above proposed structures are how to effectively detect temporary or permanent defects, make application for variety of systems to perform FFT, minimize the hardware overhead, maximize the amount of processed data and the defect detection of FFT networks, and readily extend the structure for a multidimensional FFT.

In the present invention, the above proposed structures are employed to apply an algorithm to each of the stages in the FFT network to eliminate the defects. Considering first the stage-bound checksum operation, the butterfly computation generates a pair of input numbers and a pair of output numbers, as shown by Formulae 2 and 3. From the two formulae, there are obtained Formulae 4 and 5 by means of addition and subtraction.

Formula 4

$$2a = c + d$$

Formula 5

$$2bxW_N^{jk} = c - d$$

Here, V(i,j) is made to be "j"th input number (0≦j≦N-1) of the stage-i (0≦i≦log₂N-1). Then, the equation of "i"th stage-bound checksum is obtained as shown by Formulae 6 and 7 by applying Formulae 4 and 5 to the butterfly computation at each stage.

Formula 6

$$2\sum_{j=0}^{\frac{N}{2}-1} V(i, 2j) = \sum_{j=0}^{N-1} V(i+1, j)$$

Formula 7

$$2\sum_{j=0}^{\frac{N}{2}-1} V(i, 2j+1)W_N^{jk} = \sum_{j=0}^{\frac{N}{2}-1} (V(i+1, 2j) - V(i+1, 2j+1))$$

It will be readily noted that the checksum is obtained to detect errors by computation of "i"th stage of the FFT algorithm. Thus, it is possible to detect instantly a single error or multiple errors at every stage. In addition, this stage-wise computation makes it possible to apply such structure not only to a common memory multiprocessor but to VLSI based on the FFT network.

Figure 2:
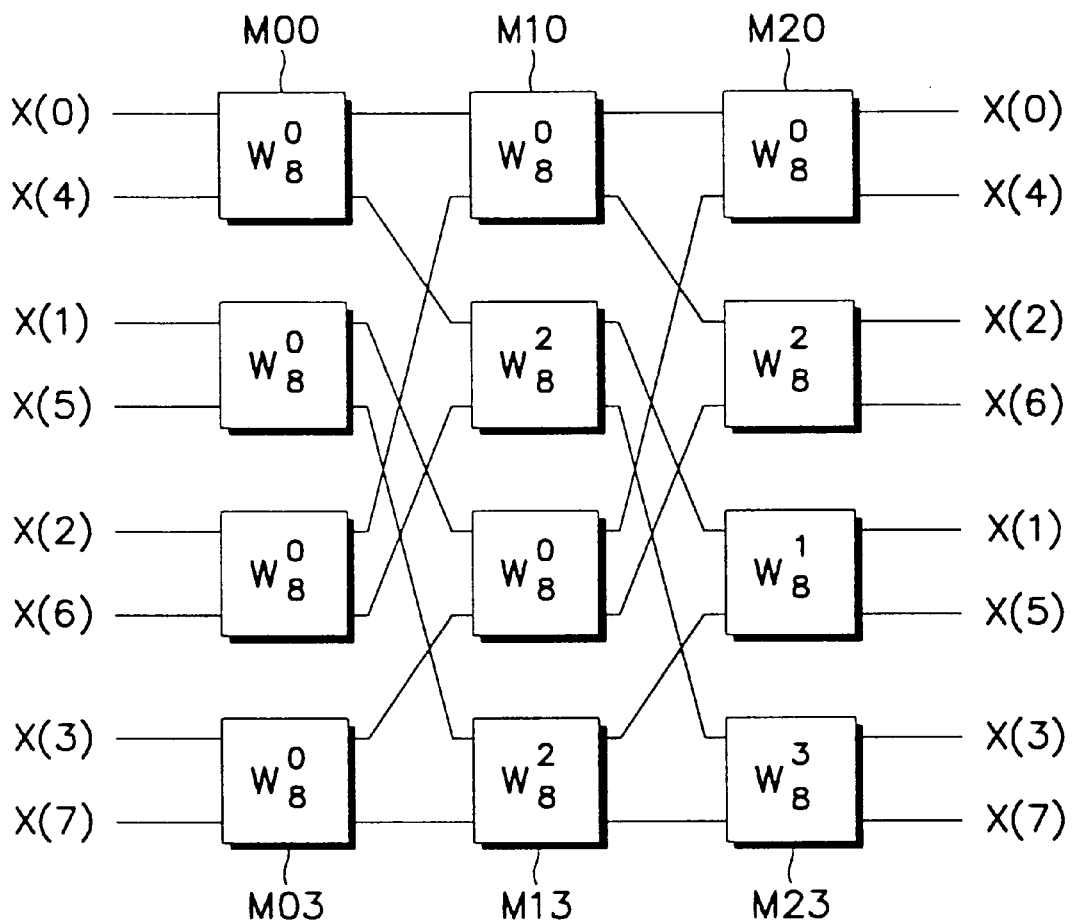
FIG. 2 is a block diagram illustrating the structure of an earlier 8-point FFT network.
Figure 3:
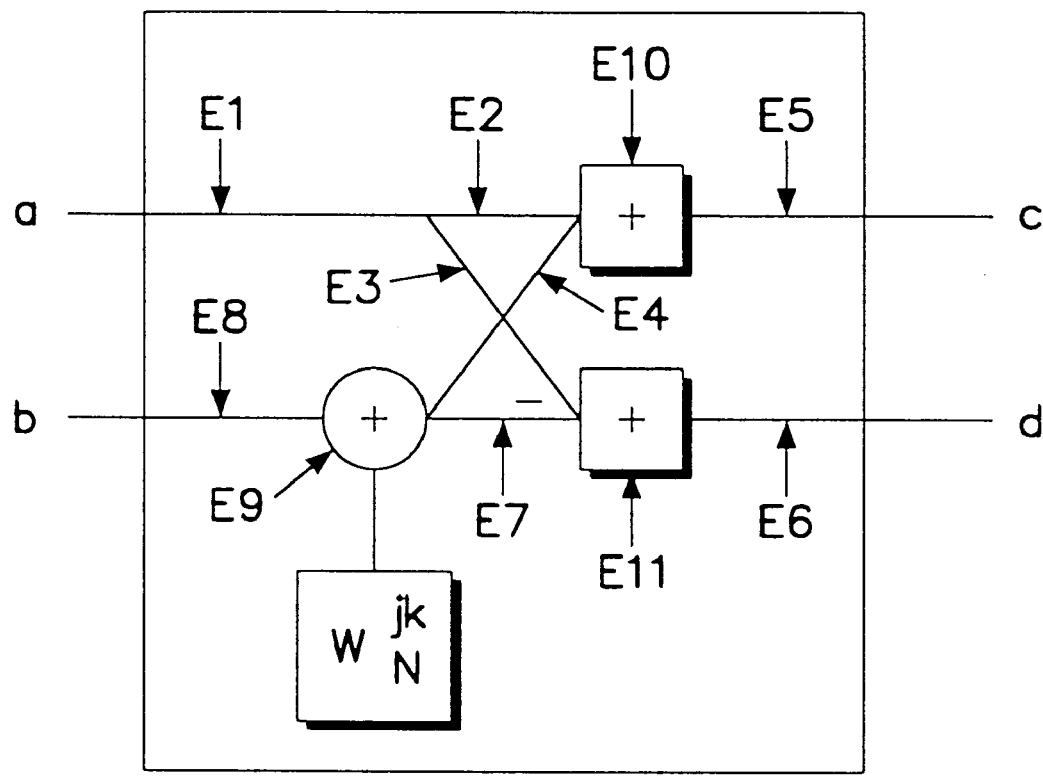
FIG. 3 is a block diagram illustrating the inventive operation for eliminating defects in a module of an FFT network.

Describing this structure applied to the FFT network with reference to FIG. 2 illustrating an 8-point FFT network including a plurality of modules M00 to M23, there are shown in FIG. 3 errors which can occur in the modules of the FFT network. If the module Mij proves Formulae 2 and 3, it is considered fault-free. Likewise, the FFT network is wholly fault-free provided Formula 1 is proved to be true.

As for the positions where there may occur errors in each of the modules of the FFT network as shown in FIG. 3, the errors E1 to E8 indicate defects in links while the errors E9 to E11 indicate defects in components. In this case, Formula 4 is used to detect link errors E1 to E7 and component errors E10 and E11 while Formula 5 is used to detect link errors E2 to E8 and component errors E9 to E11. Hence, the defects occurring in each of the modules of the FFT network as shown in FIG. 2 may be detected by using Formulae 4 and 5. Thus, the stage-bound checksum may be used to detect errors occurring in each stage of the FFT network.

Figure 4:
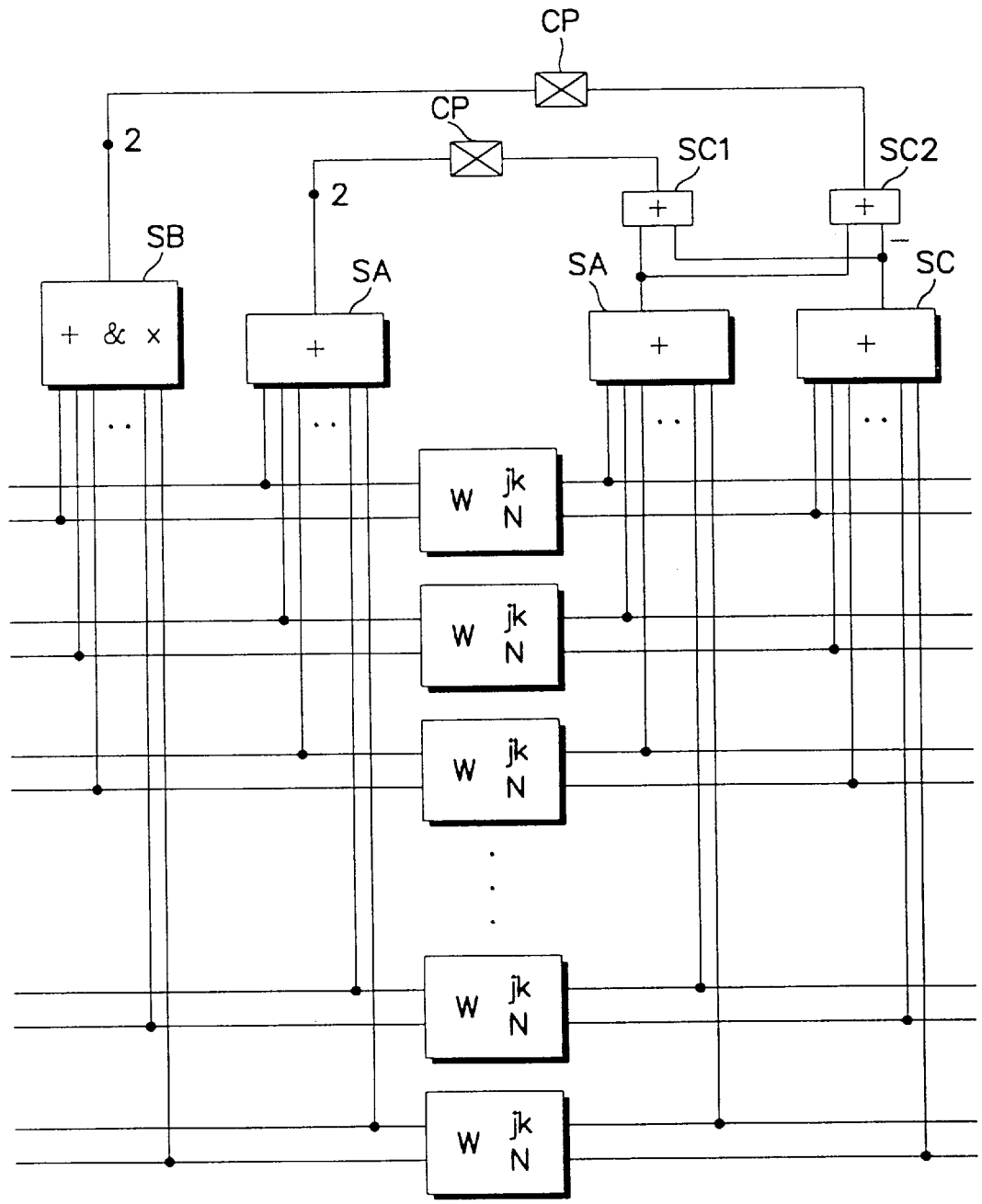
FIG. 4 is a block diagram illustrating the structure to obtain the checksum at each stage of an FFT network according to the present invention.
Figure 5:
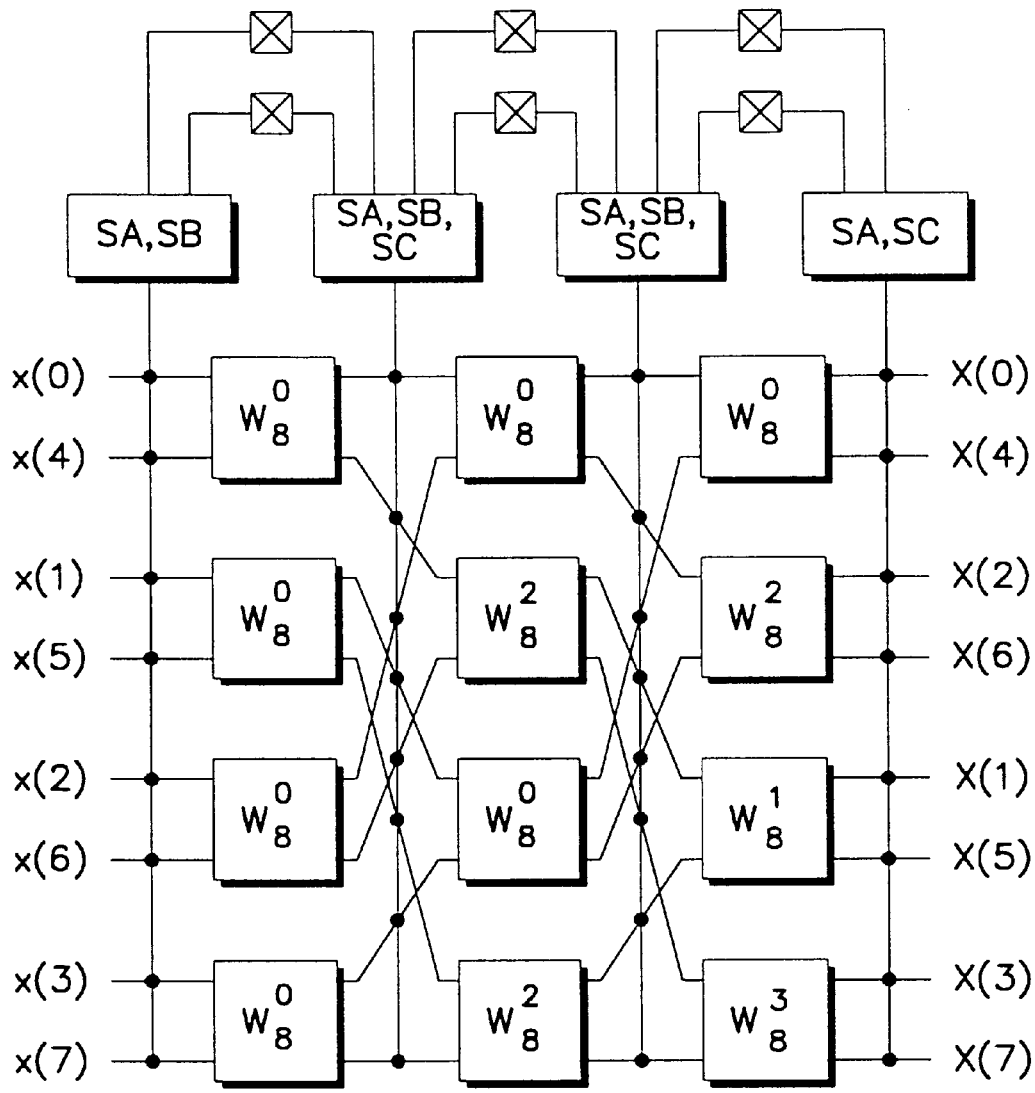
FIG. 5 is a block diagram illustrating the structure of a one dimensional FFT network according to the present invention.

Referring to FIG. 4 illustrating the structure to obtain the checksum at each stage of an N-point FFT network, the two input checksums are obtained by using two submodules SA and SB, and the two output checksums by two submodules SA and SC. In addition, the calculation of the stage-bound checksum is extended to all the network by placing error detection circuits in all of the stages as shown in FIG. 5. The error detection is performed at every stage of the FFT network. The submodules SA and SC may consist of adders of a simple structure. The multiplicative factor '2' of Formulae 6 and 7 may be simply achieved by using (ω-1)LSB of the ω-bit output of the adder and by adding zero for LSB. Hence, there is no need for any additional overhead circuit, and such condition is represented by the number 2 following the output of the adder, as shown in FIG. 4. Next, the stage-i may be provided with a submodule SB calculated by Formula 8, which submodule SB employs complex number multipliers as shown by Formula 9.

Formula 8

$$2\sum_{j=0}^{\frac{N}{2}-1} V(i, 2j+1)W_N^{jk}$$

Formula 9

$$2^{i-2} (2 \leq i \leq \log_2 N - 1)$$

The multiplier for multiplying two complex numbers α1 and α2 includes four substantial multiplications. If the real part and imaginary part of $W_N^{jk}$ are respectively $Re(W_N^{jk})$ and $Im(W_N^{jk})$, the real and imaginary parts of the product of α1 and α2 are respectively calculated by Formulae 10 and 11.

Formula 10

$$Re(\alpha1\ \alpha2) = Re(\alpha1)Re(\alpha2) - Im(\alpha1)Im(\alpha2)$$

Formula 11

$$Im(\alpha1\ \alpha2) = Re(\alpha1)Im(\alpha2) + Im(\alpha1)Re(\alpha2)$$

In Formulae 10 and 11, Re(α) and Im(α) are the real and imaginary parts of α. Hence, two real number multiplications are required for each of the two Re(α1 α2) and Im(α1 α2), and the total number of multipliers becomes four. This may be differently expressed by Formulae 12 and 13 by considering the characteristics of twiddle factors in FFT networks.

Formula 12

$$Re(W_N^0) = -Im\left(W_N^{\frac{N}{4}}\right) \text{ and } Im(W_N^0) = Re\left(W_N^{\frac{N}{4}}\right)$$

Formula 13

$$Re\left(W_N^{\frac{N}{8}}\right) = -Im\left(W_N^{\frac{N}{8}}\right) \text{ and } Im\left(W_N^{\frac{N}{8}}\right) = Re\left(W_N^{\frac{N}{8}}\right)$$

Using the Formulae above, Formula 14 can be considered as a single complex number multiplication, where b1 and b2 are complex numbers, which are calculated by performing four substantial multiplications.

Formula 14

$$b1xW_N^{\frac{N}{8}} + b2xW_N^{3\frac{N}{8}}$$

Thus, Formula 15 is obtained for j(0<j<N/8).

Formula 15

$$Re(W_N^j) = -Im\left(W_N^{j+\frac{N}{4}}\right) = -Im\left(W_N^{\frac{N}{4}-j}\right) = -Re\left(W_N^{\frac{N}{2}-j}\right)$$

$$Im(W_N^j) = Re\left(W_N^{j+\frac{N}{4}}\right) = -Re\left(W_N^{\frac{N}{4}-j}\right) = Im\left(W_N^{\frac{N}{2}-j}\right)$$

Hence, the four multiplications of $$b1xW_N^j, b2xW_N^{j+\frac{N}{4}}, b3xW_N^{\frac{N}{4}-j}, b4xW_N^{\frac{N}{2}-j}$$

are combined as a single complex number multiplication. This makes the complex number multiplicand $N_{mul}(N,i)$ required in the above stage-i to be expressed by Formula 16.

Formula 16

1. $N_{mul}(N,0)=0$

2. $N_{mul}(N,1)=0$

3. $N_{mul}(i)=2^{i-2}$ for $2 \leq i \leq \log_2 N-1$

In Formula 16, Equations 1 and 2 are clear because all the twiddle factors concerned with the modules in the stage-0 and stage-1 are respectively $$W_N^0(-1), W_N^{\frac{N}{4}} (=-1).$$

There are clearly shown twiddle factors $2^i$ in the stage-i ($2 \leq i \leq \log_2 N-1$). The total number of the multiplier, may be reduced according to the characteristics of the twiddle factors used in the FFT network. Two twiddle factors of the $2^i$ factors $W_N^0$, $W_N^{N/4}$ do not need multipliers. In addition, two other twiddle factors may be combined into one from the remaining $2^i-2$ twiddle factors. As described above for $j(0<j<N/8)$, the remaining $2^i-4$ twiddle factors are divided into $(2^i-4)/4$ groups. Then, the complex number multiplier of $(2^i-4)/4$ is required for the remaining $2^i-4$ twiddle factors, and the total number $N_{mul}(i)$ of the multipliers used in the above stage-i ($2 \leq i \leq \log_2 N-1$) is expressed by Formula 17.

Formula 17

$$N_{mul}(i)=1+\{(2^i-4)/4\}=2^{i-2}$$

Hence, the total number $N_{lm}(N)$ of the complex number multipliers used in the above structure is only $(N/4)-1$, which is expressed by Formula 18.

Formula 18

$$N_{lm}(N) = \sum_{i=2}^{\log_2 N-1} 2^{i-2} = \sum_{i=0}^{\log_2 N-3} 2^i = \frac{N}{4} - 1$$

Hence, the H/W overhead of the error detection structure is expressed by Formula 19 for the type of the input data to the N-point FFT network according to the number of the multipliers.

Formula 19

$$\frac{\frac{N}{4}-1}{\frac{N\log_2 N}{2}} \approx \frac{1}{2\log_2 N}$$

The minimum H/W overhead which has been achieved is $2/\log_2 N$ for the input of a complex number.

The components mostly employed in the above structure are all a simple adder connected between two adjacent stages. Although not described the structures of the submodules SA, SB and to SC in FIG. 5, the adders may be commonly occupied in the submodules SB and SC. The reduction of the multipliers considering the complex structure of the adders and multipliers compensates enough for the overhead by means of the additional adders. The above structure may be readily extended to a multidimensional FFT network. One two-dimensional DFT may be expressed by Formula 20.

Figure 6:
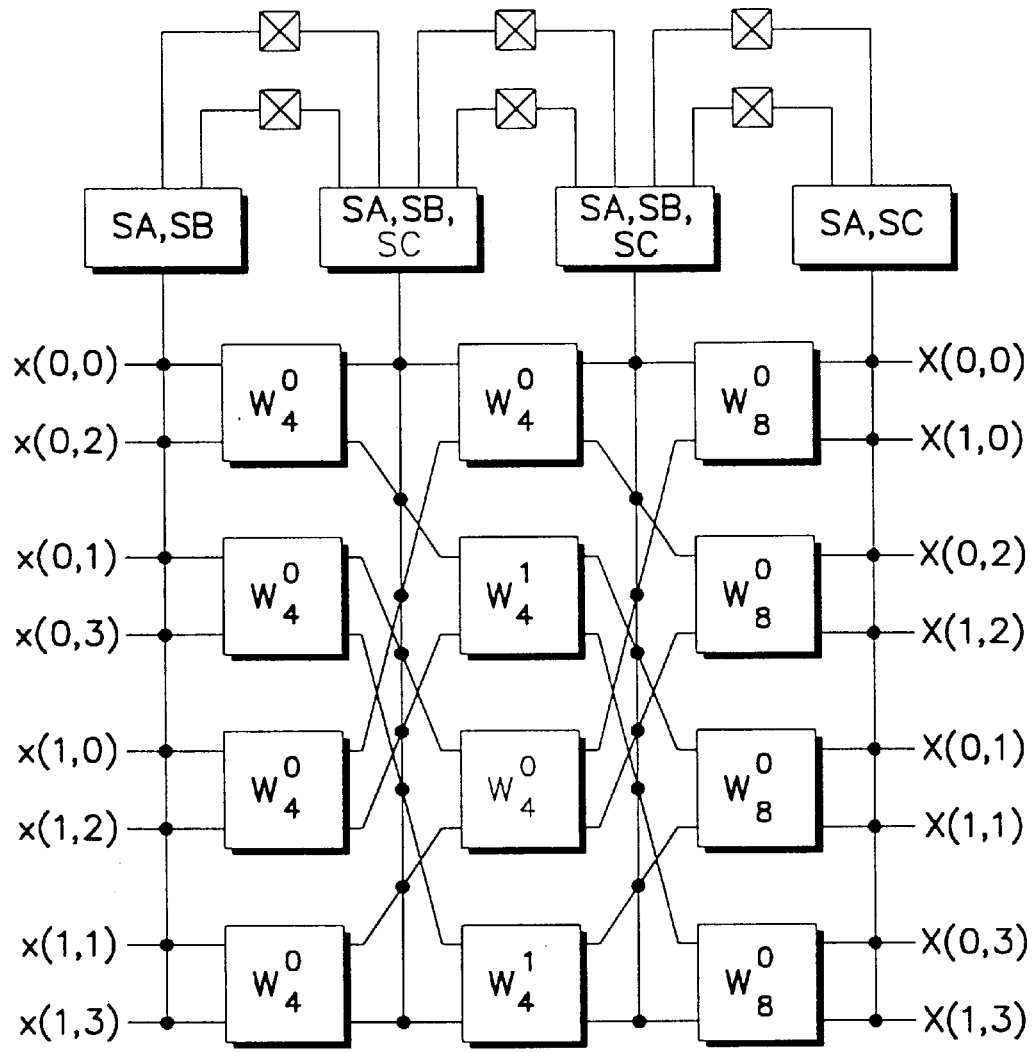
FIG. 6 is a block diagram illustrating the structure of a two dimensional FFT network according to the present invention.

Formula 20

$$X(k,l) = \sum_{m=0}^{M-1} \sum_{n=0}^{N-1} \chi(m,n) W_M^{km} W_N^{ln}$$

Wherein M and N represent the sizes of each dimension of the networks. FIG. 6 illustrates the above structure of a two dimensional FFT network. The same checksum structure based on Formulae 6 and 7 is applied to each stage.

Considering the inventive checksum structure with reference to FIG. 3, there are used Formulae 2 and 3 in each module, where "a" and "b" represent two inputs, "c" and "d" two outputs, and $W_N^{jk}$ the twiddle factor. The two checksum Formulae 2 and 3 give Formulae 4 and 5, which may be achieved in a single module. Hence, applying these formulae to every module in a single stage, checksum calculation formulae are obtained for each stage, which are Formulae 6 and 7.

Referring to FIG. 4 for illustrating the inventive checksum calculation structure in a stage, the submodule SA comprises a circuit embodying $$2\sum_{j=0}^{\frac{N}{2}-1} V(i, 2j)$$

of Formula 6, the submodule SB $$2\sum_{j=0}^{\frac{N}{2}-1} V(i, 2j+1)W_N^{jk}$$

of Formula 7, and the submodule SC $$\sum_{j=0}^{\frac{N}{2}-1} V(i+1, 2j+1)$$

of Formula 7. The results of the submodules SA, SB and SC are respectively compared through the comparators CP. As shown in FIG. 4, the multiplier is only required by the submodule SB, and the other submodules SA and SC may be embodied by adders. The outputs of the submodules SA, SB and SC are employed to calculate the checksum of the adjacent stages, as shown in FIG. 5.

Thus, the ratio of the H/W overhead required by the checksum structure of the inventive FFT network has the minimum value of about 1.2 to $2/\log_2 N$, which is almost half that of the earlier network. In addition, the detection of defects is effected at every stage to eliminate the detection delay, so that the accumulation of data errors is prevented, thereby resulting in the effective detection of the defects.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for obtaining checksum in a fast fourier transformation (FFT) network composed of N/2*logN stage modules, comprising an adder-multiplier and a first adder respectively connected to two inputs of each stage module, a second and a third adder respectively connected to two outputs of each stage module, a first comparator for comparing outputs of said first and second adders, and a second comparator for comparing outputs of said adder-multiplier and third adder, the checksum being calculated at every stage to detect defects.

2. An apparatus for obtaining checksum as defined in claim 1, said first adder performing a calculation of $$2\sum_{j=0}^{\frac{N}{2}-1} V(i, 2j)$$

and said second adder performing a calculation of $$\sum_{j=0}^{N-1} V(i+1, j),$$

where "i" represents a stage number, "j" represents a corresponding link number and "V" represents data.

3. An apparatus for obtaining checksum as defined in claim 1, said adder-multiplier performing a calculation of $$2\sum_{j=0}^{\frac{N}{2}-1} V(i, 2j+1) W_N^{jk}$$

and said third adder calculation of $$\sum_{j=0}^{\frac{N}{2}-1} (V(i+1, 2j) - V(i+1, 2j+1)),$$

where "i" represents a stage number, "j" represents a corresponding link number and "V" represents data.

4. An apparatus for obtaining checksum as defined in claim 2, said adder-multiplier performing a calculation of $$2\sum_{j=0}^{\frac{N}{2}-1} V(i, 2j+1) W_N^{jk}$$

and said third adder calculation of $$\sum_{j=0}^{\frac{N}{2}-1} (V(i+1, 2j) - V(i+1, 2j+1)),$$

where "i" represents the stage number, "j" represents the corresponding link number and "V" represents data.

5. A method for obtaining checksum in an FFT network composed of N/2*logN stage modules each having a first input and a second input and a first outputand a second output, comprising the steps of:

adding and 1-bit left-shifting the first inputs of said modules while adding, multiplying, and 1-bit left-shifting the second inputs of said modules;

adding the first and second outputs of said modules while subtracting said first outputs from said second outputs;

comparing the added and left-shifted first inputs with the added first and second outputs; and comparing the added, multiplied, and left-shifted second inputs with the result of said subtracting, whereby the checksum is calculated at every stage to detect defects.

6. A method as defined in claim 5, the addition of said first inputs being achieved by calculating $$2\sum_{j=0}^{\frac{N}{2}-1} V(i, 2j)$$

and the addition of said first and second outputs being achieved by calculating $$\sum_{j=0}^{N-1} V(i+1, j),$$

where "i" represents a stage number, "j" represents a corresponding link number, and "V" represents data.

7. A method as defined in claim 6, the addition and multiplication of said second inputs being achieved by calculating $$2\sum_{j=0}^{\frac{N}{2}-1} V(i, 2j+1) W_N^{jk}$$

and the subtraction of said first and second outputs being achieved by calculating $$\sum_{j=0}^{\frac{N}{2}-1} (V(i+1, 2j) - V(i+1, 2j+1)),$$

where "i" represents a stage number, "j" represents a corresponding link number and "V" represents data.

8. A method as defined in claim 5, the addition and multiplication of said second inputs being achieved by calculating $$2\sum_{j=0}^{\frac{N}{2}-1} V(i, 2j+1) W_N^{jk}$$

and the subtraction of said first and second outputs being achieved by calculating $$\sum_{j=0}^{\frac{N}{2}-1} (V(i+1, 2j) - V(i+1, 2j+1)),$$

where "i" represents the stage number, "j" represents the corresponding link number and "V" represents data.

* * * * *